W. F. PURDY.
SICKLE.
APPLICATION FILED JULY 30, 1921.

1,428,657.

Patented Sept. 12, 1922.
2 SHEETS—SHEET 1.

W. F. Purdy
INVENTOR

BY Victor J. Evans
ATTORNEY

WITNESS:

W. F. PURDY.
SICKLE.
APPLICATION FILED JULY 30, 1921.
1,428,657. Patented Sept. 12, 1922.
2 SHEETS—SHEET 2.
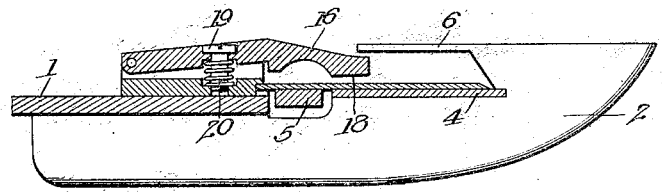
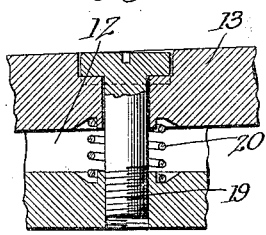
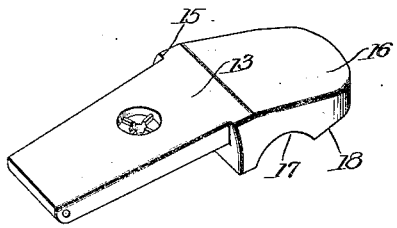
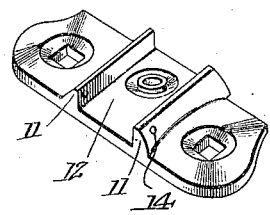
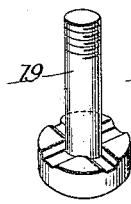
W. F. Purdy
INVENTOR
BY Victor J. Evans
ATTORNEY
WITNESS:

Patented Sept. 12, 1922.

1,428,657

UNITED STATES PATENT OFFICE.

WILBUR F. PURDY, OF CHINOOK, MONTANA.

SICKLE.

Application filed July 30, 1921. Serial No. 488,639.

*To all whom it may concern:*

Be it known that I, WILBUR F. PURDY, a citizen of the United States, residing at Chinook, in the county of Blaine and State of Montana, have invented new and useful Improvements in Sickles, of which the following is a specification.

My present invention has reference to improvements in clips designed as an attachment for mowers, harvesters and like machines used for cutting grass and grain. In machines of this character wherein reciprocating knives are used, the knife, while working, wobbles between the guard to such an extent to prevent the grass or grain being cut clean and allows the grain or other material to clog between the knife and guard, the result being a great inconvenience to the operator who must remove the obstruction before the machine can be again successfully operated, and at the same time causes the knife to dull, requiring the resharpening thereof before further successful operation.

The object of my invention is to overcome this difficulty by producing a clip which will securely hold the knife in position with respect to the finger bar without interfering with the free reciprocation of the knife, and also wherein the clip is adjustable with respect to its engagement with the upper face of the reciprocatory knife blade.

A further object is to produce a knife blade attachment for cutting machines in the nature of an adjustable spring influenced clip which may be secured upon the machine by the same bolts that are used for securing thereon the ordinary clips, and which also, is of such a nature as to permit of the ready separation of the knife bar from the finger bar, for the sharpening of the knife bar, if desired.

The foregoing, and other objects which will appear as the nature of the invention is better understood, may be accomplished by a construction, combination and operative association of parts, such as is disclosed by the drawings which accompany and which form part of this specification.

In the drawings:—

Figure 3 is a substantially similar sectional view but illustrating the manner in which the knife bar may be removed, for sharpening, etc., without the removal of the improvement from the finger bar.

Figure 4 is an enlarged fragmentary sectional view of the tensioning means.

Figure 5 is a perspective view of the clip.

Figure 6 is a similar view of the clip base.

Figure 7 is an inverted perspective view of the tensioning bolt.

Figure 1:
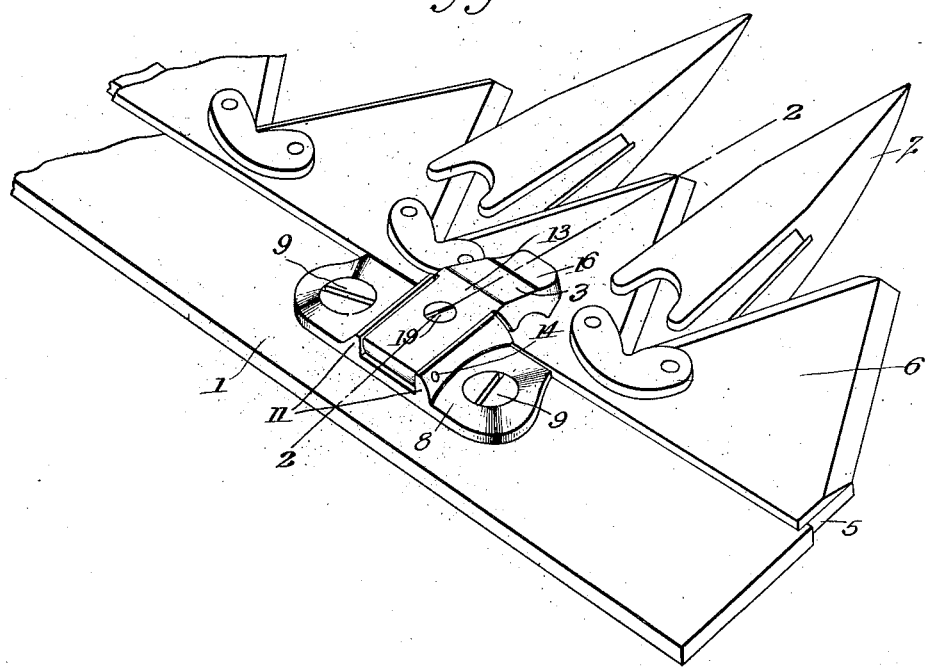
Figure 1 is a perspective view of a fragment of a cutting apparatus illustrating the application of the improvement.
Figure 2:
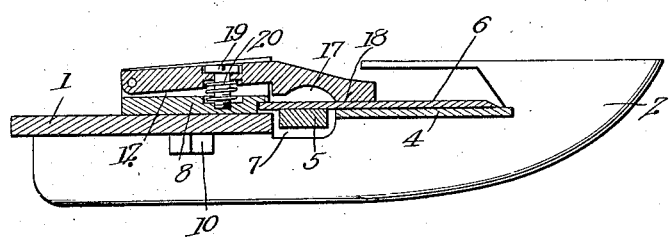
Figure 2 is a sectional view on the line 2—2 of Figure 1.

Referring now to the drawings in detail, the numeral 1 designates the finger bar, on which is carried at desired intervals in length, the finger guard shoes 2 and clips 3, 4 designating the stationary cutter bar plate or sole attached in any desired manner to the finger. A reciprocatory cutter bar 5, on which are fastened the cutting plates or knives 6 is mounted for movement between the forward or extended end of the clip 3 and the fingers or guards 2, the whole being arranged in working relation to each other in the usual manner.

The cutter bar 5 operates as usual in a recess 7, formed in the finger for its accommodation, and in the operation of the mower in harvesting grain, grass or other growths, difficulty is encountered by the grass, particularly when wet or moist, being drawn between the knife or cutters, 6 and the stationary cutter blade 4, or within the recess 7, causing the bars to become clogged and practically inoperable until they have been cleaned. At times also, after prolonged use, the cutting edges of the cutters become dulled or otherwise deranged, necessitating the removal of the cutter bar for the purpose of grinding or otherwise sharpening the knives. My present invention is designed to obviate these objections to a natural extent by the provision of means to maintain a close cutting contact between the cutters to prevent admission of grass between the same, and also facilitates loosening or removal of the clip 3 to enable the cutters to be conveniently freed from entangling grass or removed for such purpose or for sharpening. The clip 3 includes a base 8 which is of a size similar to the base of the clips ordinarily employed, the said base being preferably centrally depressed upon its under face and having adjacent its ends the bolt openings through which pass the bolts 9 that also pass through the finger bar 1, the said bolts being engaged by the usual nuts 10. The base 8, upon the upper face thereof is provided with equidistantly spaced ribs 11—11, the outer faces of the said ribs being inclined, and the inner faces thereof being straight. The ribs gradually diverge away from each other from the rear to the front edge of the base, and the space between the ribs provides a pocket 12 for the body portion 13 of the clip 3. The body is gradually increased in width from one to its opposite end to be snugly received in the pocket between the ribs 11, the said body being pivoted, as at 14 to the ribs, adjacent to the reduced end of the pocket and the reduced end of the body. The body has its outer end widened to provide shoulders 15 that are disposed opposite the spread ends of the ribs 11, and from the said shoulders the body is continued to provide what I will term a finger portion 16. The under face of the finger portion, adjacent to the outer end thereof is grooved transversely, as at 17, the portion of the said finger outward of the groove providing the contact portion of the finger, the latter, being for distinction indicated by the numeral 18, and rests directly on the reciprocatory cutter 6. The groove 17 is positioned above the bolts that secure the cutting knives 6 to the cutter bar 5.

The pocket 12 is deeper at the end thereof adjacent which the shoulders 15 of the finger 16 are arranged, and the inner wall of the deepened portion of the pocket is provided with a threaded opening which is disposed opposite a similar opening in the body 13. Through these openings there is passed the threaded shank of a screw or bolt 19, the threads of the shank engaging the threads in the opening in the body, and arranged in the pocket, surrounding the shank of the bolt 19 and exerting a pressure between the lower wall of the pocket and the body 13, is a helical spring 20. The bolt 19 is preferably provided with a kerfed head that is received in a reamed portion that surrounds the opening through which the shank of the bolt passes, and it will be apparent that by the employment of a suitable pointed instrument, such as a screw driver, the bolt may be moved longitudinally and the spring adjusted whereby the contact surface 18 of the finger may be brought into proper frictional engagement with the cutters 6 to adjust the same with respect to the stationary cutters 4. Thus a proper frictional engagement between the cutters may be at all times maintained, but in addition to this, the removal of the bolt 19 permits of the finger and its body 13 being swung upon its pivot 14 to bring the same away from the cutters, to permit of the removal of the cutters for the sharpening thereof.

It is to be further noted that the adjustable screw or bolt 19 holds the spring 20 in proper position under all conditions, and it is thought that the foregoing description, when taken in connection with the drawings will fully set forth the construction and advantages of the improvement to those skilled in the art to which such inventions relate without further detailed description.

Having described the invention, I claim:—

1. In a mowing machine, a finger bar having a guard carrying a stationary cutter, a reciprocating cutter cooperating therewith, a clip including a base secured to the finger bar, spaced ribs on the base providing a pocket therebetween, a body pivotally secured in the pocket to the ribs, said body having its outer portion widened to provide shoulders that are disposed opposite the ribs and to provide a finger outward of the shoulders, spring means exerting a lifting pressure between the body and the base, removable means adjustably connecting the body to the base, whereby the finger of the body may be brought into frictional contact with the base of the said body and its finger swung away from the base, and said adjusting means providing a guide for the spring.

2. In a mowing machine, a finger bar having a guard carrying a stationary cutter, a reciprocating cutter cooperating therewith, a clip including a base secured to the finger bar, spaced ribs on the base providing a pocket therebetween and said ribs being inclined with respect to each other, a body snugly received in the pocket pivoted to the ribs, said body having its outer portion shouldered and the said shoulders being disposed opposite the ribs and terminating in an outwardly projected downwardly inclined finger, a spring seated in the pocket and exerting a lifting pressure on the body, and a bolt member passing freely through the body and screwed into the base and also passing centrally through the spring providing a guide for the spring and means whereby the finger may be brought into varying frictional engagements with the reciprocating cutter.

In testimony whereof I affix my signature.

WILBUR F. PURDY.